(12) United States Patent
Cho et al.

(10) Patent No.: US 12,490,090 B2
(45) Date of Patent: Dec. 2, 2025

(54) SYSTEMS AND METHODS FOR EPHEMERAL TOKEN-BASED DEVICE IDENTIFIER DETECTION

(71) Applicant: Verizon Patent and Licensing Inc., Basking Ridge, NJ (US)

(72) Inventors: Jae Cho, Demarest, NJ (US); Kartik P. Umamaheswaran, Belle Mead, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 257 days.

(21) Appl. No.: 18/318,898

(22) Filed: May 17, 2023

(65) Prior Publication Data

US 2024/0388900 A1  Nov. 21, 2024

(51) Int. Cl.
*H04W 12/06* (2021.01)
*G06F 9/54* (2006.01)

(52) U.S. Cl.
CPC ............ *H04W 12/06* (2013.01); *G06F 9/547* (2013.01)

(58) Field of Classification Search
CPC ............ H04W 12/06; H04W 12/69–72; H04L 63/08; H04L 63/0876; H04L 9/3213
See application file for complete search history.

(56) References Cited

U.S. PATENT DOCUMENTS

| 9,591,434 B1* | 3/2017 | Cordes | H04L 63/0272 |
| 2015/0044997 A1* | 2/2015 | Efrati | H04W 12/06 |
| | | | 455/411 |
| 2023/0007001 A1* | 1/2023 | Modi | H04W 12/08 |
| 2023/0224704 A1* | 7/2023 | Atarius | H04W 12/12 |
| | | | 726/6 |

* cited by examiner

*Primary Examiner* — Daniel B Potratz (57) ABSTRACT

A validation system includes a user equipment (UE) and a client server. The UE is configured to store a device identifier associated with the UE. In response to a first validation request triggered by an application program of the UE, the UE is configured to encrypt the device identifier to generate an ephemeral token having a token value that is representative of the device identifier, transmit the first validation request including the ephemeral token, receive a first validation response based on the first validation request, and provide the first validation response to the application program. The client server is configured to receive the first validation request, transmit a second validation request, including the ephemeral token, for validation of the ephemeral token, receive a second validation response based on the ephemeral token included in the second validation request, and generate the first validation response based on the second validation response.

19 Claims, 7 Drawing Sheets

SYSTEMS AND METHODS FOR EPHEMERAL TOKEN-BASED DEVICE IDENTIFIER DETECTION

BACKGROUND

User equipment (UE), such as a mobile phone, may use secure servers to authenticate devices, applications, and account information. Some client server authentication solutions rely on users of the UE for manually providing authenticating information in order for a client server to grant account access and to perform additional account-related operations associated with a user account. For example, the user may submit a query request and the client server may require validation of the user and/or the UE associated with the user account prior to acting on the query request.

DETAILED DESCRIPTION OF EXAMPLE EMBODIMENTS

The following detailed description of example implementations refers to the accompanying drawings. The same reference numbers in different drawings may identify the same or similar elements.

A UE may download an application (e.g., for business, social media, utility services, health, finance, entertainment, and/or the like) from one of many different sources. The application may be associated with a service provider that provides a service to a user of the UE through a user account. In some cases, the service provided may be specific to the UE. The service provider may maintain a client server, such as an information technology (IT) server or another service provider server, for providing account access to the user through the application.

The UE may be prompted by the user, through an interaction (e.g., user input) made via the application, to provide a query request to the client server to authenticate the application, the user, and/or the UE associated with the user account. For example, the service provider may be a telecommunications provider that provides telecommunications services over a cellular network to the user via the UE. In some cases, the user may desire to add an additional phone line to the user account, transfer service from one phone to another phone (e.g., from one UE to another UE), and/or activate a new device on the account, which may require embedded subscriber identity module (eSIM) activation and/or troubleshooting. However, for some services, such as eSIM activation, the user may be required to go to a physical retail location for service. For example, in some cases, information needed to authenticate a user associated with a user account for eSIM activation may be treated as customer proprietary network information (CPNI) and is not able to be provided electronically from the user (e.g., from the application) to the service provider. For example, the application installed on the UE and associated with the service provider may not be able to directly access or read all information needed to authenticate the user (e.g., for an eSIM activation) to be provided in a query request. In some cases, the application may be blocked from accessing CPNI stored on the UE and thus cannot transmit the CPNI or use the CPNI for user authentication with the service provider to gain account access for performing certain service requests for the user. Thus, certain service requests may not be possible through the application or may need to be conducted manually through user entry of the information, which may impose an inconvenience on the user and limit the application's ability (e.g., the UE's ability) to provide a self-service interaction between the user and the service provider.

Thus, some client server authentication solutions rely on users of the UE for manually providing authenticating information in order for the client server to grant account access and to perform additional account-related operations associated with the user account. For example, the user may trigger the query request through the application and the client server may require validation of the user and/or the UE associated with the user account prior to acting on the query request. Manually entering authenticating information can be both time consuming and prone to error. When an error in entering authenticating information occurs, the user may be denied access to the user's account, may be denied performance of the query request, and/or may be required to start a new validation session with the client server. As a result, manual entry of authenticating information can be inefficient. The UE may also waste networking and/or computing resources when an authentication fails due to incorrect entry of the authenticating information, which may include a need to start a new validation session with the client server.

Some implementations are directed to a validation system that includes a UE, a client server, and a token validation server (e.g., a user equipment server). The UE may be any wireless communication device that has an International Mobile Equipment Identity (IMEI) number associated with the UE. For example, the UE may be a wireless transmit/receive unit (WTRU), a mobile phone, a smartphone, or another type of client device configured to operate and/or communicate in a wireless environment. The UE may be configured to store an IMEI (e.g., the IMEI number) or some other device identifier associated with the UE. The IMEI or the other device identifier may be regarded as CPNI that is to be handled in a secure manner. In addition, the UE may have an application (e.g., an application program) that is configured to be executed by one or more processors of the UE. The application may be associated with a service provider that maintains the client server. In other words, the client server may be associated with the application program for providing access to a user account that is associated with a user of the UE or with the UE itself. The client server may also be configured to respond to query requests received from the UE that are triggered through the application via user interaction and/or user input. A query request may be or may include a validation request for validation or authentication of the user and/or the UE.

The IMEI is a unique numeric identifier or code that identifies certain types of UEs, such as mobile phones, some satellite phones, and other mobile communication devices. Phone carriers, as one type of service provider, and manufacturers (e.g., original equipment manufacturers (OEMs)) may share IMEI numbers to enable tracking of mobile phones that may be stolen or compromised. Thus, an OEM may maintain a token validation server (e.g., an OEM server) that stores and/or is coupled to a database of IMEIs related to UEs manufactured by that OEM. Since an application is installed on the UE, the IMEI may be unique to both the user and the UE associated with the application that is installed on the UE. Thus, the IMEI may be used for validation or authentication of the user and/or the UE.

However, since the service provider typically does not have access to the IMEI of the UE, the client server of the service provider may be configured to communicate with the token validation server in order to obtain the IMEI (and/or other device/user identifying information) and to validate or authenticate the user and/or the UE associated with a user account. For example, in some implementations, the UE may transmit an ephemeral token having a token value representing or associated with the IMEI of the UE. The ephemeral token may be an encrypted version (e.g., a cryptographic representation) of the IMEI. For example, the ephemeral token may be a hash and the token value may be a hash value generated by the UE based on the IMEI. In some implementations, a random salt may be added to the IMEI before hashing. A "salt'" may be arbitrary data added to a value passing through a hashing function to increase the security of the hash. The random salt may change for each instance the ephemeral token is generated so that the ephemeral token changes over time. The random salt may be generated by a random number generator (RNG) or a pseudo random number generator (PRGN) of the UE. The ephemeral token may be invoked by the application and transmitted from the UE to the client server as a query request or a validation request. In other words, the UE may be triggered to generate the ephemeral token-based on a user interaction or user input made using the application associated with the client server. The UE may transmit the ephemeral token using an application programming interface (API) that enables communication between the application at the UE and the client server.

The client server may be configured to receive the ephemeral token and transmit the ephemeral token to the token validation server (e.g., the OEM server) via a corresponding validate request. The token validation server may be configured to validate the ephemeral token, and transmit the IMEI associated with the ephemeral token to the client server upon validating the ephemeral token. For example, the token validation server may be configured to decrypt the ephemeral token to determine the IMEI, compare the IMEI with the IMEIs stored in the database of IMEIs to determine whether the IMEI matches one of the IMEIs, and generate a validation response based on whether the IMEI matches one of the IMEIs. The validation response includes the IMEI when the IMEI matches one of the IMEIs, in order to provide the client server access to the IMEI associated with the UE. Conversely, the validation response does not include the IMEI when the IMEI does not match one of the IMEIs.

Upon receiving the IMEI, the client server may validate or authenticate the user and/or the UE associated with the user account and perform further operations associated with the query request, including adding an additional phone line to the user account, transferring service from one phone to another phone (e.g., from one UE to another UE), and/or activating a new device on the account, which may require device-specific information and/or CPNI, such as the IMEI. Thus, services that may require sensitive information, such as device-specific information and/or CPNI (e.g., for eSIM activation), may become possible with a user's interaction through the application installed on the UE instead of through a physical presence at a retail location. For example, a validation flow that uses the ephemeral token for authentication may de-risk exposure of sending out device-specific information and/or CPNI directly from the UE to the client server, which are typically connected by an unsecure connection. In addition, the UE may be configured to automatically generate and transmit the ephemeral token in response to the user interaction or the user input made through the application associated with the client server. Thus, the application may provide the user with self-service functionality for services that may require device-specific information and/or CPNI. Furthermore, errors that may result from manual entry of authenticating information by a user may be reduced or eliminated. Furthermore, the validation flow may save or more efficiently utilize networking and/or computing resources by correctly providing the authenticating information on a first attempt (e.g., in a single validation session).

Figure 1:
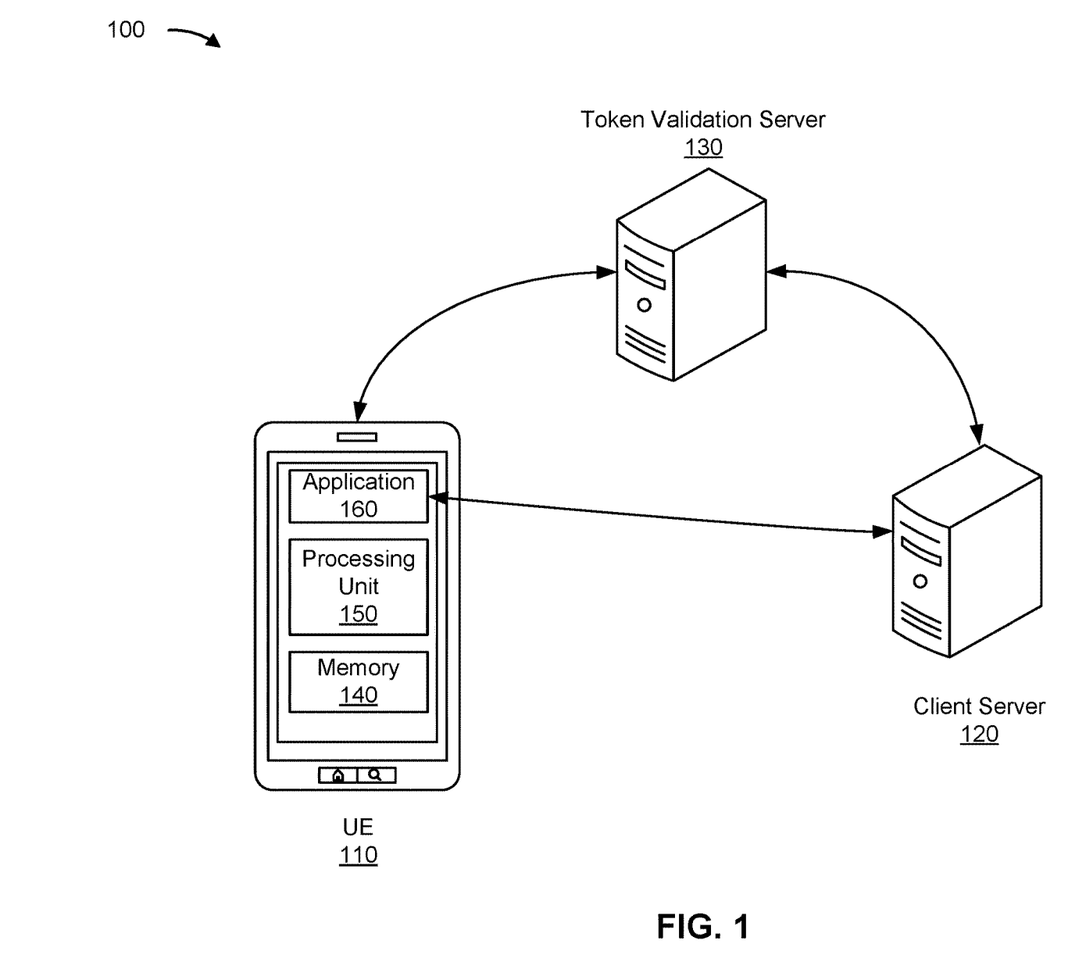
FIG. 1 is a diagram of a validation system according to one or more implementations.

FIG. 1 is a diagram of a validation system 100 according to one or more implementations. The validation system 100 includes a UE 110, a client server 120, and a token validation server 130 interconnected by a network. For example, the UE 110, the client server 120, and the token validation server 130 may interconnect via wired connections, wireless connections, or a combination of wired and wireless connections. The UE 110 may be any wireless communication device that has a device identifier, such as an IMEI, that identifies the UE 110. The device identifier may be stored in a memory device 140 of the UE 110 that is accessible by an operating system of the UE 110 via a processing unit 150 of the UE 110. The processing unit 150 may include one or more processors configured to perform functions associated with the operation of the UE 110. Additionally, the UE 110 may have an application 160 (e.g., an application program) installed on the UE 110. The application 160 may be installed in the memory device 140 of the UE and executable by the processing unit 150 (e.g., executable by one or more processors). Since the application 160 is installed on the UE 110, the device identifier (e.g., the IMEI) may be unique to both the user and the UE associated with the application 160 that is installed on the UE 110. Thus, the device identifier may be used for validation or authentication of the user and/or the UE 110.

The application 160 may be associated with a service provider that maintains or is associated with the client server 120. In other words, the client server 120 may be associated with the application program for providing access to a user account that is associated with a user of the UE 110 or with the UE 110 itself. For example, the user may use the application 160 to log into the user account and manage one or more aspects of the user account (e.g., add a service, discontinue a service, change a service, report a technical issue, access billing information, report a dispute, etc.). The client server 120 may also be configured to respond to query requests (e.g. validation requests) received from the UE 110 that are triggered through the application 160 via user interaction and/or user input. A query request may be or may include a validation request for validation or authentication of the user and/or the UE 110. The client server 120 may require authentication of the user and/or the UE 110 prior to acting on a query request.

The client server 120 may be a server device that includes one or more processors configured to fulfill requests received from the UE 110. For example, the client server 120 may interact with (e.g., communicate with) the application 160 and perform one or more functions in response to receiving a query request, such as a validation request, from the UE 110 that has been triggered by the application 160. The client server 120 may be physically located within a carrier's information technology (IT) infrastructure (e.g., a network provider's IT infrastructure), where the carrier may be a service provider that provides communication services to the UE 110 through a core network (e.g., a cellular network) and/or an internet network.

The token validation server 130 may be a server device that includes one or more processors configured to fulfill requests (e.g., validation requests) received from the client server 120. In some implementations, the token validation server 130 may also be communicatively coupled to the UE 110 via the network for receiving the device identifier from the UE 110. The token validation server 130 may be configured to access a database of device identifiers in response to receiving a validation request from the client server 120. For example, in some implementations, the token validation server 130 may include an internal memory device that stores the database of device identifiers. Alternatively, in some implementations, the token validation server 130 may be coupled, via the network, to an external memory device that stores the database of device identifiers. In some implementations, the token validation server 130 is an OEM server that stores and/or is coupled to the database of device identifiers related to UEs manufactured by an OEM. Thus, the token validation server 130 may be maintained by or may be associated with the OEM.

The client server 120 of the service provider may be configured to communicate with the token validation server 130 in order to obtain the device identifier and to validate or authenticate the user and/or the UE 110 associated with the user account. For example, in some implementations, the UE 110 may transmit an ephemeral token (e.g., a device token) having a token value representing the device identifier of the UE 110. The ephemeral token may be an encrypted version (e.g., a cryptographic representation) of the device identifier. For example, the ephemeral token may be a hash and the token value may be a hash value generated by the UE 110 based on the device identifier. Thus, the processing unit 150 of the UE 110 may include an encryption module or a cryptographic engine that is configured to encrypt the device identifier stored in the memory device to generate the ephemeral token. When invoked by the application 160, the one or more processors of the processing unit 150 may receive the device identifier from the memory device 140 and generate the ephemeral token for transmission to the client server 120. The ephemeral token may be temporarily stored at the UE 110 and may be used for a single validation session or a single query session, after which the ephemeral token expires and becomes unusable and/or deleted.

The ephemeral token may be invoked by the application 160 and transmitted from the UE 110 to the client server 120 in a query request or in a validation request. In other words, the processing unit 150 may be triggered to generate the ephemeral token-based on a user interaction or user input made using the application 160 associated with the client server 120. The UE 110 may transmit the ephemeral token using an API that enables communication between the application 160 at the UE 110 and the client server 120.

The client server 120 may be configured to receive the ephemeral token and transmit the ephemeral token to the token validation server 130 (e.g., the OEM server) via a corresponding validate request. The token validation server 130 may be configured to validate the ephemeral token, and transmit the device identifier associated with the ephemeral token to the client server 120 upon validating the ephemeral token. For example, the token validation server 130 (e.g., one or more processors of the token validation server 130) may be configured to decrypt the ephemeral token to determine the device identifier, compare the device identifier with the device identifiers stored in the database of device identifiers to determine whether the device identifier matches one of the device identifiers, and generate a validation response based on whether the device identifier matches one of the device identifiers. Thus, one or more processors of the token validation server 130 may include a decryption module or a cryptographic engine configured to decrypt the ephemeral token to obtain the device identifier from the ephemeral token.

In some implementations, the token validation server 130 may have a mapping between device identifiers and ephemeral tokens. That is, the mapping may be stored at the token validation server 130 and updated based on information provided by one or more UEs. For example, the UE 110 may provide the token validation server 130 with an ephemeral token or information corresponding to a mapping of the ephemeral token and the UE's device identifier for updating the mapping stored at the token validation server 130. Thus, the token validation server 130 may determine whether an ephemeral token received in a validate request from the client server 120 corresponds to a device identifier, without decrypting the ephemeral token, based on the mapping between device identifiers and ephemeral tokens stored at the token validation server 130. The token validation server 130 may determine whether the ephemeral token matches a device identifier in the mapping, and generate a validation response based on whether the device identifier matches one of the device identifiers.

The validation response includes the device identifier when the device identifier obtained from the ephemeral token matches one of the device identifiers, in order to provide the client server 120 with the device identifier associated with the UE 110. Conversely, the validation response does not include the device identifier when the device identifier obtained from the ephemeral token does not match one of the device identifiers.

Upon receiving the device identifier from the token validation server 130, the client server 120 may validate or authenticate the user and/or the UE 110 associated with the user account and perform further operations associated with the query request. For example, based on the validation response including the device identifier, the client server 120 (e.g., the one or more processors of the client server 120) may be configured to authenticate the user account associated with the device identifier and perform an account operation associated with the query request and/or the validation request for the user account received by the client server 120 from the UE 110. In some implementations, based on the validation response including the device identifier, the client server 120 (e.g., the one or more processors of the client server 120) may be configured to validate that the device identifier is associated with the user account and perform the account operation associated with the request and/or the validation request for the user account received by the client server 120 from the UE 110. For example, the account operation may include upgrading a device (e.g., the UE 110) for a mobile phone line associated with the user account, authenticating an account management application (e.g., the application 160) installed on the UE 110, activating a new mobile phone line for the user account, or transmitting an eSIM profile of a subscriber identity module (SIM) card for the user to activate on a cellular network.

The client server 120 may provide a query request (e.g., a validation response) to the UE 110 in response to the query request (e.g., validation request) based on the validation response received from the token validation server 130. For example, the application 160 may be configured to receive an input for a user request, invoking the generation and transmission of the ephemeral token, and indicate to the user whether or not the user request has been performed by the client server 120 based on the validation response received by the UE 110 from the client server 120.

In some implementations, the UE 110 may transmit the ephemeral token to the token validation server 130 in addition to transmitting the ephemeral token to the client server 120. The token validation server 130 (e.g., the one or more processors of the token validation server 130) may be configured to validate the ephemeral token received from the client server 120 based on the ephemeral token received from the UE 110. For example, the token validation server 130 may be configured to compare the ephemeral token received from the UE 110 with the ephemeral token received from the client server 120 and decrypt the ephemeral token received from the client server 120 only if the two ephemeral tokens match.

After some predefined amount of time, all ephemeral tokens associated with a validation session may expire and become unusable. As a result, the device identifier of the UE 110 remains secure. After the ephemeral tokens expire, a new validation session needs to be initiated with a new ephemeral token being generated by the UE 110 in order to perform a further query request. This validation flow may de-risk exposure of sending out device-specific information, such as the device identifier, directly from the UE 110 to the client server 120, which are typically connected by an unsecure connection. In addition, the UE 110 may be configured to automatically generate and transmit the ephemeral token in response to the user interaction or the user input made through the application associated with the client server 120. Thus, errors that may result from manual entry of authenticating information by a user may be reduced or eliminated. Furthermore, the validation flow may save or more efficiently utilize networking and/or computing resources by correctly providing the authenticating information on a first attempt (e.g., in a single validation session).

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2A:
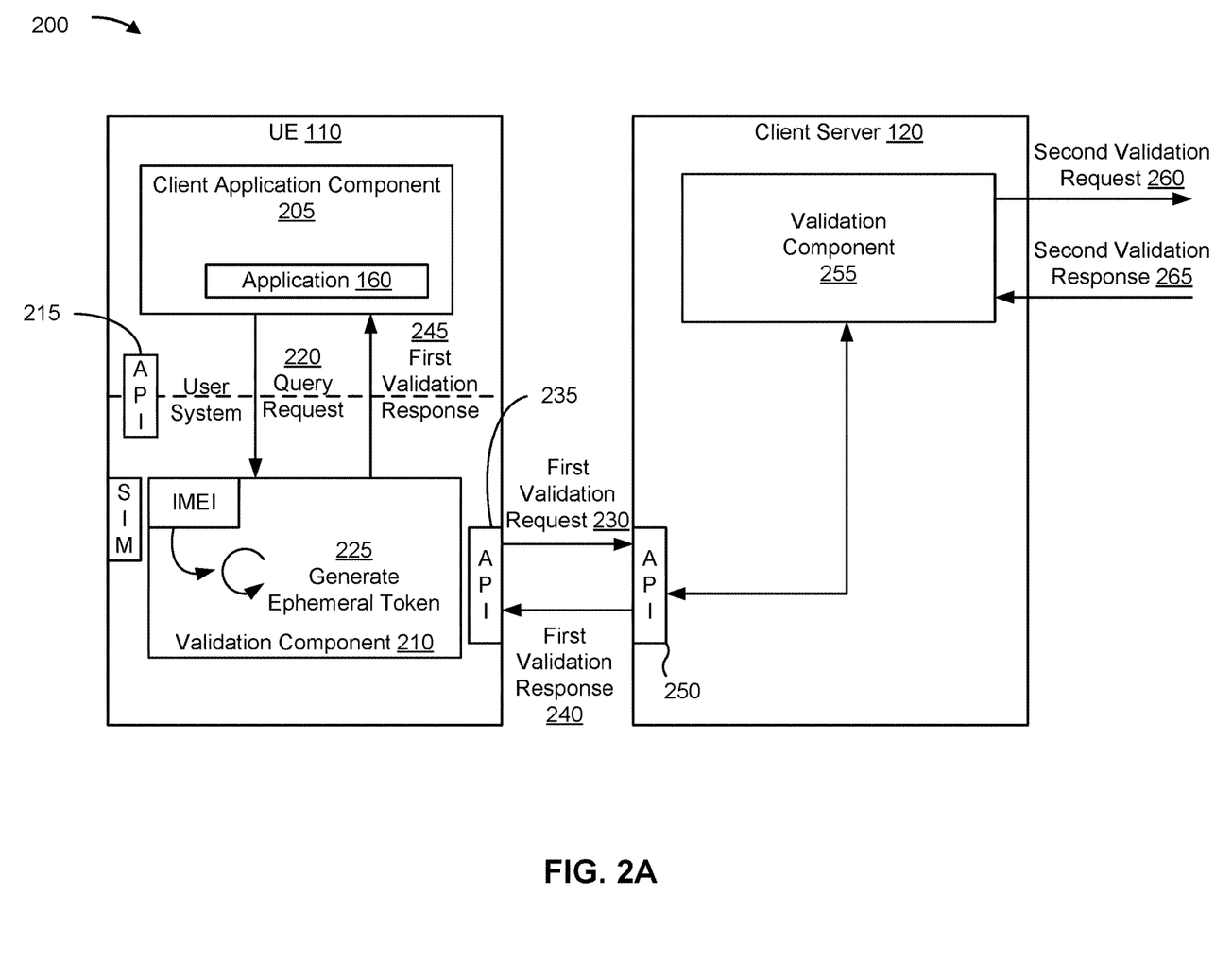
FIGS. 2A and 2B illustrate a validation flow of a UE and a client server related to validating a user and/or a UE associated with a user account.
Figure 2B:
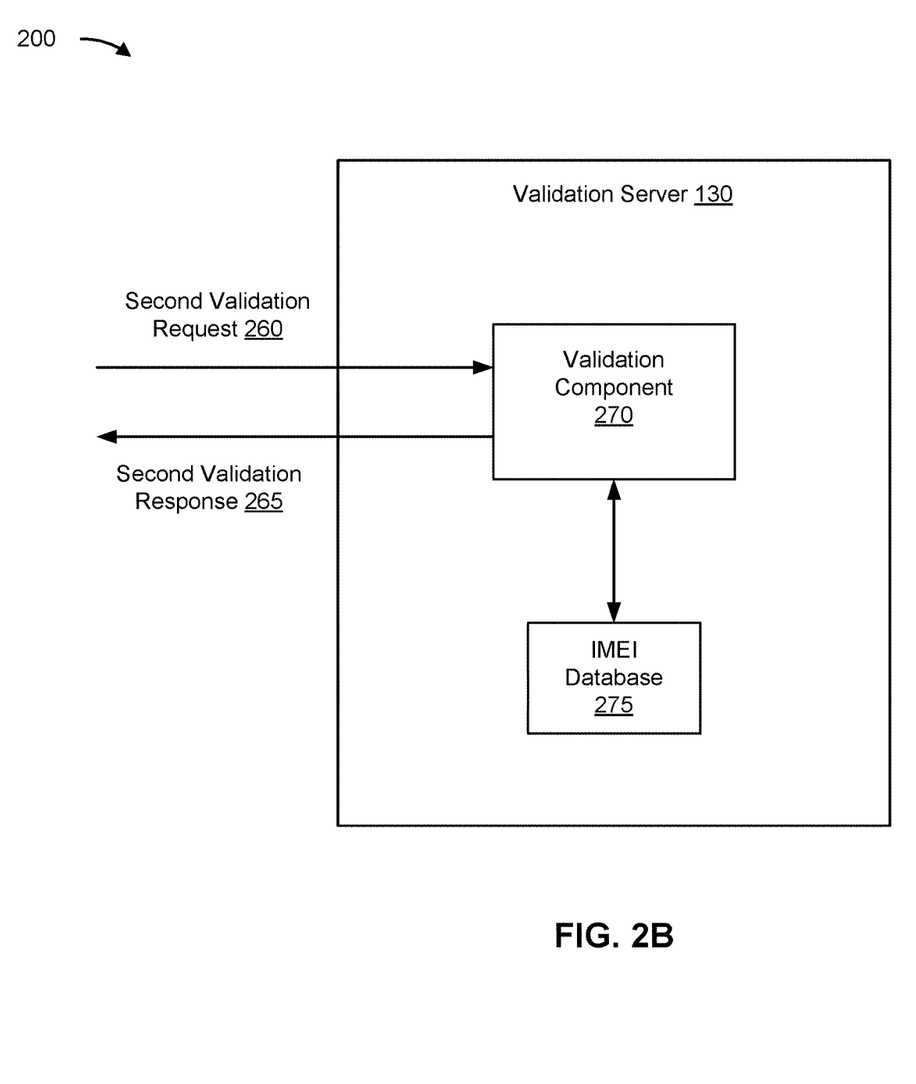

FIGS. 2A and 2B illustrate a validation flow 200 of the UE 110 and the client server 120 related to validating a user and/or a UE associated with a user account. The UE 110 may include a user partition and a system partition in one or more memories. The UE 110 may include a client application component 205 in the user partition to process the application 160. The client application component 205 may be responsible for processing the application 160, requesting validation of the user and/or the UE 110, and receiving a validation response message indicating whether the user and/or the UE 110 is authenticated. However, many actors, trusted and untrusted, may access the user partition of the UE 110.

In contrast, the system partition of the UE 110 may be protected by an operating system of the UE 110 and may only be accessible by software developed by trusted actors (e.g., factory installed software). Therefore, the UE 110 may include a validation component 210 in the system partition of the UE 110. The validation component 210 may be protected from unauthorized access in the system partition and may have system-level security that is not available to the client application component 205. The validation component 210 may be responsible for generating device tokens, such as ephemeral tokens in response to a trigger invoked by the application 160. The client application component 205 and the validation component 210 may use a device-level application program interface (API) 215 of the UE 110 to transmit messages (e.g., requests and responses) between client application component 205 and the validation component 210.

The validation component 210 may include a validation engine implemented in hardware (e.g., implemented in one or more processors) and configured to generate ephemeral tokens. The validation engine may include an encryption module or a cryptographic engine. The validation component 210 may cause the validation engine to obtain information that validation component 210 may need to generate an ephemeral token. For example, the validation component 210 may obtain the device identifier of the UE 110 from memory of the UE 110 in response to a query request 220 (e.g., associated with a validation request) received from the client application component 205 that has been invoked by the application 160.

The validation component 210 may be configured to generate the ephemeral token for the client server 120 in response to a first validation request 230 being triggered by the query request 220. Thus, based on the query request 220, the validation component 210 may obtain the device identifier and generate the ephemeral token having a token value that is representative of the device identifier, as indicated by reference number 225. The validation component 210 may generate the ephemeral token by encrypting the device identifier, for example, by hashing the device identifier using a hash function. The hash function may be a keyed-hash message authentication code (HMAC) using a secure hash algorithm (SHA), such as HMAC-SHA256. Other examples of hash functions that may be used include SHA-256, SHA-224, SHA-512/224, SHA-512/256, and/or the like. The hash function may be any other hash function variant such as from sets SHA-2, SHA-3, and/or the like.

The UE 110 may include a system-level API 235 for enabling communications between the UE 110 and the client server 120. For example, once the ephemeral token is generated, the validation component 210 may provide the first validation request 230 (e.g., a first validation message) that includes the ephemeral token to the system-level API 235 for transmission to the client server 120. Alternatively, the validation component 210 may provide the ephemeral token to the system-level API 235 and the system-level API 235 may generate the first validation request 230, that includes the ephemeral token, for transmission to the client server 120. The system-level API 235 may use a communication interface of the UE 110 for performing the transmission of the first validation request 230.

The system-level API 235 may transmit the first validation request 230, including the ephemeral token, to the client server 120. In addition, the system-level API 235 may receive a first validation response 240 from the client server 120 based on the first validation request 230, after the client server 120 performs a validation operation. The first validation response 240 may indicate whether or not an account operation corresponding to the query request 220 has been performed based on a validation result of the device identifier provided in the first validation request 230. Thus, the first validation response 240 may indicate a status of the first validation request 230 and, thereby, a status of the query request 220. As indicated by reference number 245, the device-level API 215 may be configured to transmit the first validation response 240 from the validation component 210 to the client application component 205. The application 160 may be configured to indicate whether or not the query request 220 (e.g., the user request) has been performed by the client server 120 based on the first validation response 240, where the first validation request 230 was triggered by a user input for the query request 220.

The client server 120 may include a system-level API 250 that is configured to receive the first validation request 230 from the system-level API 235. The client server 120 may further include a validation component 255 that receives the first validation request 230 from the system-level API 250 and performs the validation operation in order to authenticate or validate the user and/or the UE 110 associated with a user account that has been accessed using the application 160. The validation component 255 may include one or more processors configured to interact with the token validation server 130 in order to perform the validation operation. For example, the validation component 255 (e.g., the one or more processors of the validation component) may be configured to receive the first validation request 230 from the system-level API 250 and generate a second validation request 260, including the ephemeral token. The validation component 255 may further be configured to transmit the second validation request 260, for validation of the ephemeral token, to the token validation server 130 and receive a second validation response 265 from the token validation server 130 based on the ephemeral token included in the second validation request 260 (see e.g., FIG. 2B). The client server 120 and the token validation server 130 may include respective system-level APIs for enabling communication. The validation component 255 may further be configured to generate the first validation response 240 based on the second validation response 265 and transmit the first validation response 240 to the system-level API 250 for transmission to the system-level API 235.

In some implementations, the validation component 255 may generate the second validation request 260 by forwarding the first validation request 230 as the second validation request 260 to the token validation server 130. In some implementations, the validation component 255 may generate the second validation request 260 by obtaining the ephemeral token from the first validation request 230 and generating the second validation request 260 to include the ephemeral token. The second validation request 260 may be a token validation request configured to trigger a token validation of the ephemeral token at the token validation server 130. For example, the second validation response 265 may include the device identifier (e.g., unencrypted) when the ephemeral token has been validated by the token validation server 130.

The token validation server 130 may validate the ephemeral token by decrypting the ephemeral token to determine the device identifier, comparing the device identifier with device identifiers stored in a database of device identifiers to determine whether the device identifier matches one of the device identifiers, and generate the second validation response 265 based on whether the device identifier matches one of the device identifiers. Thus, the second validation response 265 may indicate whether or not the ephemeral token is associated with a valid device identifier, and the second validation response 265 may include the device identifier (e.g., unencrypted) when the ephemeral token is associated with the valid device identifier. On the other hand, the second validation response 265 does not include the device identifier when the device identifier does not match one of the device identifiers stored in the database of device identifiers.

Upon receiving the device identifier from the token validation server 130, the validation component 255 may determine that the first validation request 230 is authentic. For example, upon receiving the device identifier from the token validation server 130, the validation component 255 may validate or authenticate the user and/or the UE 110 associated with the user account accessed by the application 160 and perform further operations associated with the query request 220. For example, based on the second validation response 265 including the device identifier, the validation component 255 may be configured to authenticate the user account associated with the device identifier and perform the account operation associated with the query request 220 and/or the first validation request 230 for the user account accessed by the application. In some implementations, based on the validation response including the device identifier, the client server 120 (e.g., the one or more processors of the client server 120) may be configured to validate that the device identifier is associated with the user account and perform the account operation associated with the query request 220 and/or the first validation request 230 for the user account accessed by the application 160. For example, the account operation may include upgrading a device (e.g., the UE 110) for a mobile phone line associated with the user account, authenticating an account management application (e.g., the application 160) installed on the UE 110, activating a new mobile phone line for the user account, or transmitting an eSIM profile of a SIM card for the user to activate on a cellular network.

As shown in FIG. 2B, the token validation server 130 may include a validation component 270 that may be configured to validate the ephemeral token and generate the second validation response 265 based on a result of the validation of the ephemeral token. For example, the validation component 270 may be coupled to a device identifier database 275 that stores device identifiers associated with respective UEs. In some implementations, the device identifier database 275 is provided in an external device that is coupled to the token validation server 130 by a network. The validation component 270 may include a validation engine implemented in hardware (e.g., implemented in one or more processors) and configured to decrypt an ephemeral token received in the second validation request 260 to obtain a corresponding device identifier. The validation engine may include a decryption module or a cryptographic engine. The validation component 270 may decrypt the ephemeral token to obtain the device identifier, compare the device identifier with device identifiers stored in a device identifier database 275 to determine whether the device identifier matches one of the device identifiers stored in the device identifier database 275, and generate the second validation response 265 based on whether the device identifier matches one of the device identifiers stored in the device identifier database 275. Thus, the second validation response 265 may indicate whether or not the ephemeral token is associated with a valid device identifier, and the second validation response 265 may include the device identifier (e.g., unencrypted) when the ephemeral token is associated with the valid device identifier. On the other hand, the second validation response 265 does not include the device identifier when the device identifier does not match one of the device identifiers stored in the database of device identifiers.

As indicated above, FIGS. 2A and 2B are provided as examples. Other examples may differ from what is described with regard to FIGS. 2A and 2B. The number and arrangement of devices shown in FIGS. 2A and 2B are provided as an example. In practice, there may be additional devices, fewer devices, different devices, or differently arranged devices than those shown in FIGS. 2A and 2B. Furthermore, two or more devices shown in FIGS. 2A and 2B may be implemented within a single device, or a single device shown in FIGS. 2A and 2B may be implemented as multiple, distributed devices. Additionally, or alternatively, a set of devices (e.g., one or more devices) shown in FIGS. 2A and 2B may perform one or more functions described as being performed by another set of devices shown in FIGS. 2A and 2B.

Figure 3:
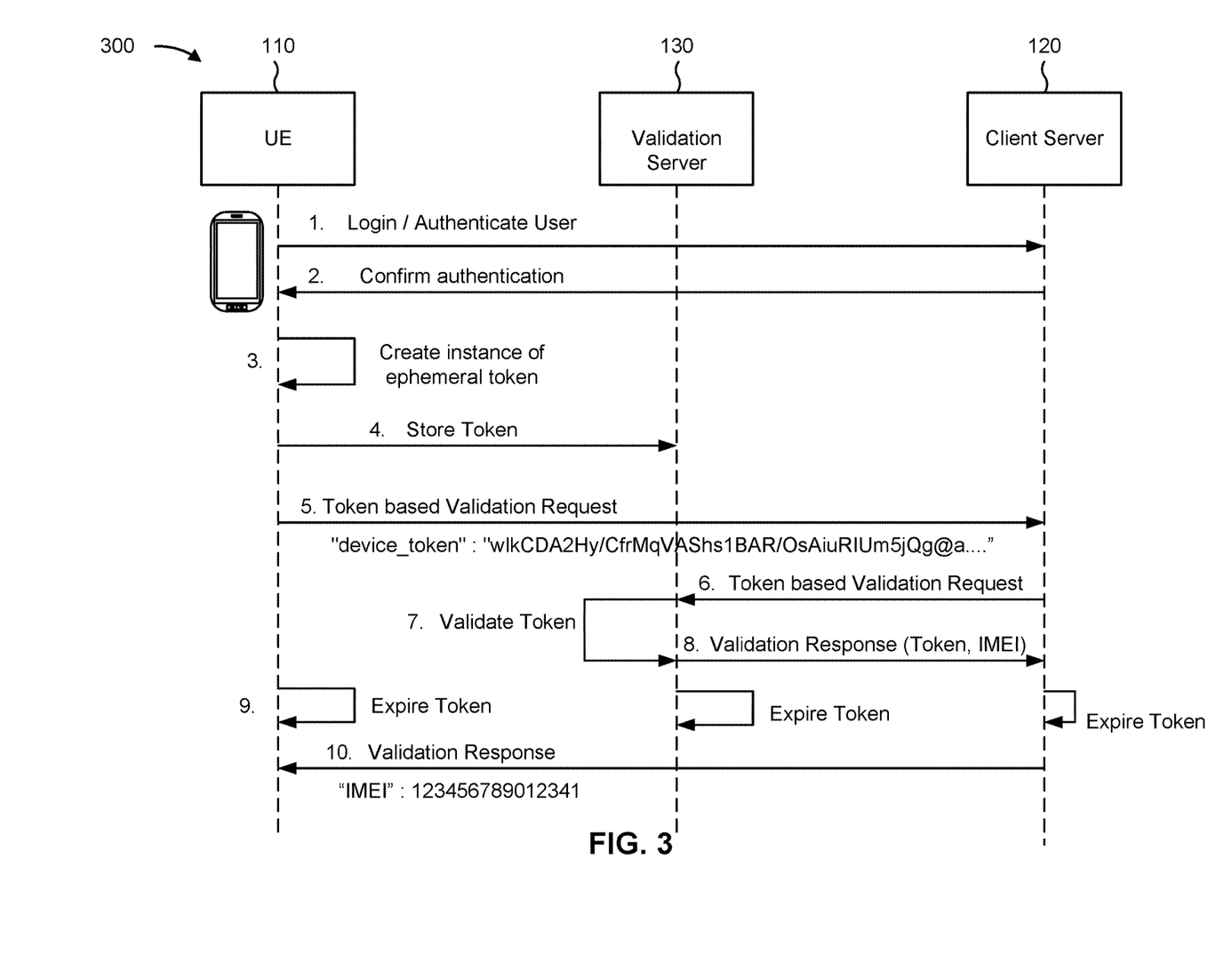
FIG. 3 illustrates a call flow diagram of a UE being validated using an ephemeral token, which corresponds to operations shown in connection with FIGS. 1, 2A, and 2B.

FIG. 3 illustrates a call flow diagram 300 of a UE 110 being validated using an ephemeral token, which corresponds to operations shown in connection with FIGS. 1, 2A, and 2B. The client server 120 may be physically located within a carrier's IT infrastructure, where the carrier may be a service provider that provides communication services to the UE 110 through a core network (e.g., a cellular network) and/or an internet network. The token validation server 130 may be physically located within an OEM's IT infrastructure.

The UE 110, the client server 120, and/or the token validation server 130 may communicate via one or more base stations and/or communication networks. Each base station may be any type of device configured to wirelessly interface with the UE 110, the client server 120, and/or the token validation server 130 to facilitate access to one or more communication networks, such as a core network, the Internet, and/or the other networks. By way of example, a base station may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, or the like. A base station may be part of a radio access network (RAN), which may also include other base stations and/or network elements, such as a base station controller (BSC), a radio network controller (RNC), relay nodes, and the like. A base station may be configured to transmit and/or receive wireless signals on one or more carrier frequencies, which may be referred to as a cell. The one or more carrier frequencies may be in a licensed spectrum, an unlicensed spectrum, or a combination of the licensed and the unlicensed spectrum. A cell may provide coverage for a wireless service to a specific geographical area that may be relatively fixed or that may change over time.

As shown by step 1, a user may log into a user account by providing valid login information to the client server 120 through the application 160 installed on the UE 110. At step 2, the client server 120 may confirm authentication of the login information and grant the user access to the user account through the application 160. At step 3, the UE 110 may, in response to a user request submitted through the application 160, generate an ephemeral token-based on the device identifier of the UE 110. At step 4, the UE 110 may optionally transmit the ephemeral token to the token validation server 130. At step 5, the UE 110 may transmit the ephemeral token to the client server 120 in a first token-based validation request that includes the ephemeral token. At step 6, the client server 120 may transmit a second token-based validation request that includes the ephemeral token to the token validation server 130. At step 7, the token validation server 130 may validate the ephemeral token by decrypting the ephemeral token to determine the device identifier, comparing the device identifier with device identifiers stored in a database of device identifiers to determine whether the device identifier matches one of the device identifiers, and generating a validation response based on whether the device identifier matches one of the device identifiers. At step 8, the token validation server 130 may transmit the validation response with the device identifier obtained from the ephemeral token if the device identifier matches one of the device identifiers. Alternatively, the token validation server 130 may transmit the validation response without the device identifier obtained from the ephemeral token if the device identifier does not match one of the device identifiers. At step 9, the ephemeral tokens stored at the UE 110, client server 120, and/or the validation server expire. At step 10, the client server 120 transmits a validation response to the UE 110 based on the validation response received from the validation server in step 8. In some implementations, an order of the steps may vary or the call flow may include additional steps, fewer steps, and/or different steps.

As indicated above, FIG. 3 is provided as an example. Other examples may differ from what is described with regard to FIG. 3.

Figure 4:
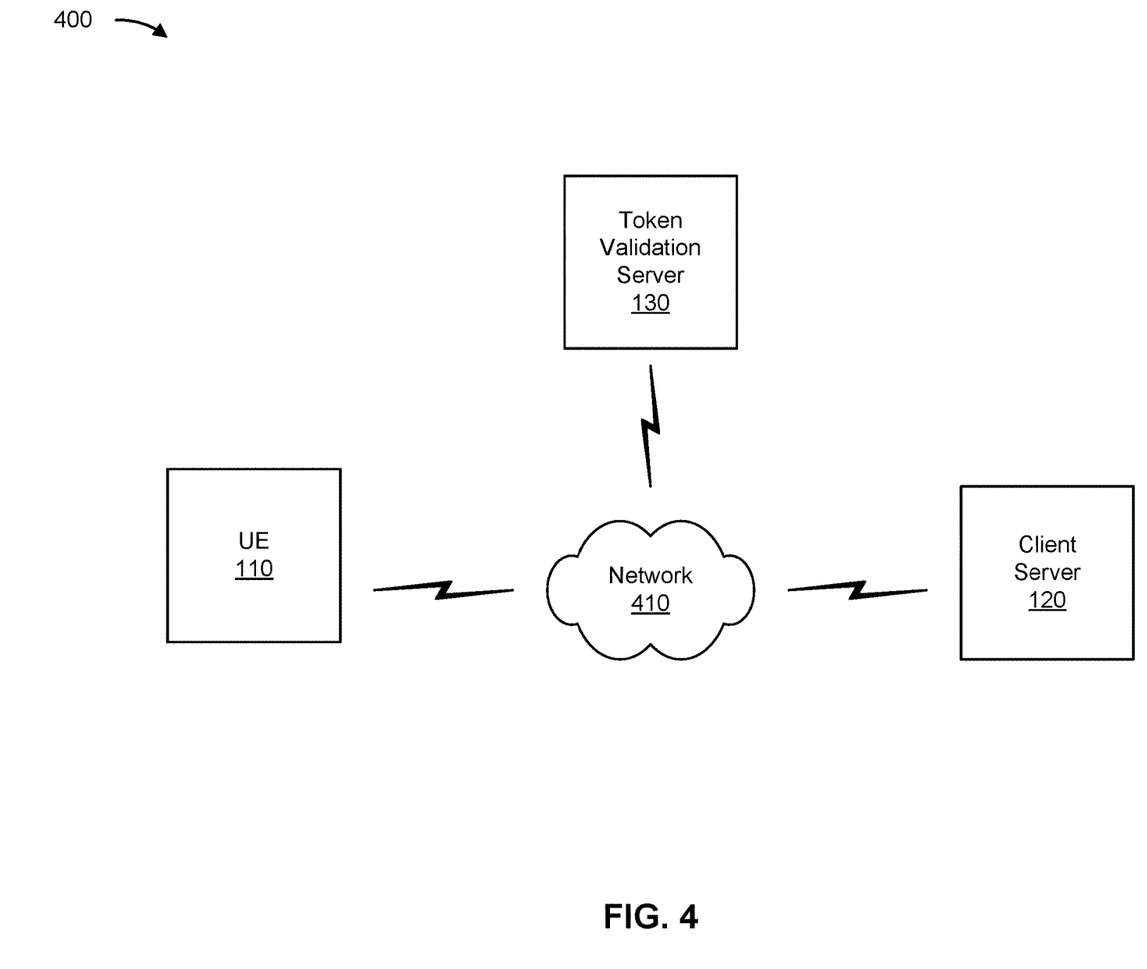
FIG. 4 is a diagram of an example environment in which systems and/or methods, described herein, may be implemented.

FIG. 4 is a diagram of an example environment 400 in which systems and/or methods, described herein, may be implemented. As shown in FIG. 4, environment 400 may include the UE 110, the client server 120, the token validation server 130, and/or a network 410. Devices of environment 400 may interconnect via wired connections, wireless connections, optical connections, or a combination of connections.

The UE 110 includes one or more devices capable of receiving, generating, storing, processing, and/or providing information associated with token validation. For example, the UE 110 may include a communication and/or computing device, such as a phone (e.g., a mobile phone, a radiotelephone, a smartphone, etc.), a laptop computer, a tablet computer, a handheld computer, a gaming device, a wearable communication device (e.g., a smart wristwatch, a pair of smart eyeglasses, etc.), or any other similar device identified by a unique device identifier, such as a device identifier. In some implementations, the UE 110 may establish a communication session (e.g., a validation session) with the client server 120 via network 410. For example, the UE 110 and the client server 120 may communicate via one or more base stations. In some implementations, the UE 110 may also establish a communication session with the token validation server 130 via network 410. For example, the UE 110 and the token validation server 130 may communicate via one or more base stations.

The client server 120 includes one or more devices capable of receiving, storing, processing, and/or providing information associated with token validation. In some implementations, the client server 120 may establish a communication session (e.g., a validation session) with the token validation server 130 via network 410. For example, the client server 120 and the token validation server 130 may communicate via one or more base stations, the core network, the Internet, and/or other networks.

The token validation server 130 includes one or more devices capable of receiving, storing, processing, and/or providing information associated with token validation.

The network 410 includes one or more wired and/or wireless networks. For example, the network 410 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
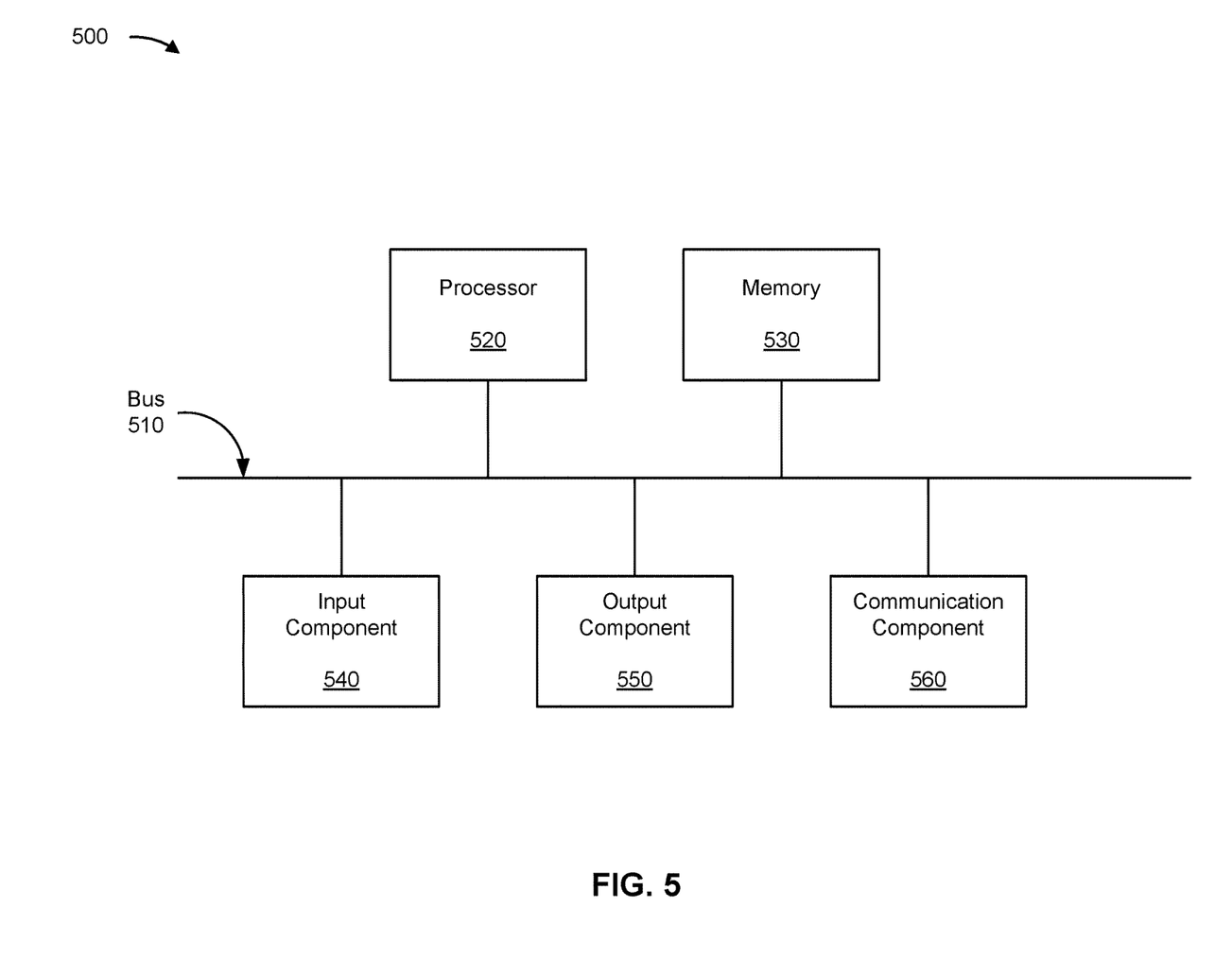
FIG. 5 is a diagram of example components of a device associated with ephemeral token-based IMEI detection.

FIG. 5 is a diagram of example components of a device 500 associated with ephemeral token-based device identifier detection. The device 500 may correspond to the UE 110, the client server 120, and/or the token validation server 130. In some implementations, the UE 110, the client server 120, and/or the token validation server 130 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a communication interface, an API, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
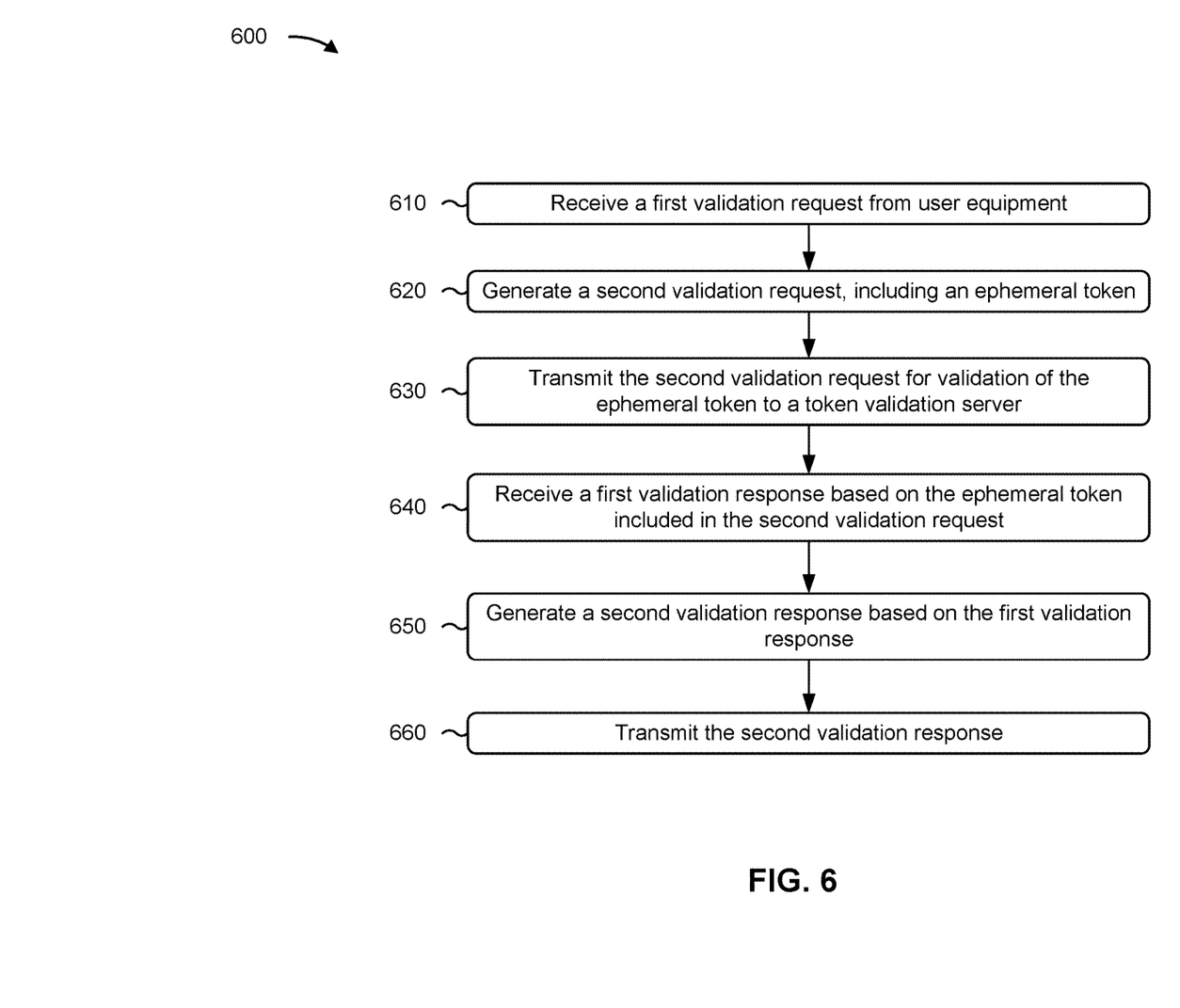
FIG. 6 is a flowchart of an example process associated with systems and methods for ephemeral token-based device identifier detection.

FIG. 6 is a flowchart of an example process 600 associated with systems and methods for ephemeral token-based device identifier detection. In some implementations, one or more process blocks of FIG. 6 are performed by a client server (e.g., client server 120). In some implementations, one or more process blocks of FIG. 6 are performed by or conjunction with another device or a group of devices separate from or including the client server, such as a UE (e.g., UE 110), and/or a token validation server (e.g., token validation server 130). Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving a first validation request from the UE (block 610). The first validation request may include an ephemeral token having a token value that is representative of a device identifier associated with the UE. For example, the client server may receive the first validation request from the UE, as described above.

The UE may execute an application program that is configured to trigger the first validation request. The client server may be associated with the application program. For example, the client server may provide access to a user account through the application program. The UE may generate the first validation request, including encrypting the device identifier to generate the ephemeral token having the token value, and transmit the first validation request to the client server using an API.

As further shown in FIG. 6, process 600 may include generating a second validation request, including the ephemeral token (block 620). For example, the client server may generate the second validation request, including the ephemeral token, as described above.

As further shown in FIG. 6, process 600 may include transmitting the second validation request for validation of the ephemeral token to a token validation server (block 630). For example, the client server may transmit the second validation request for validation of the ephemeral token to the token validation server, as described above.

As further shown in FIG. 6, process 600 may include receiving a first validation response based on the ephemeral token, included in the second validation request, from the token validation server (block 640). The first validation response may indicate whether or not the ephemeral token is associated with a valid device identifier. For example, the client server may receive the first validation response from the token validation server, as described above.

The token validation server may decrypt the ephemeral token provided in the second validation request to determine the device identifier. The token validation server may compare the device identifier with device identifiers stored in a database of device identifiers to determine whether the device identifier matches one of the device identifiers. The token validation server may generate the second validation response based on whether the device identifier matches one of the device identifiers. The second validation response may include the device identifier when the device identifier matches one of the device identifiers, and the second validation response may not include the device identifier when the device identifier does not match one of the device identifiers. The token validation server may transmit the second validation response to the client server.

In some implementations, the token validation server may receive the ephemeral token from the UE, and validate the ephemeral token received in the second validation request based on the ephemeral token received from the UE.

As further shown in FIG. 6, process 600 may include generating a second validation response based on the first validation response (block 650). The second validation response may include a status of the first validation request. For example, the client server may generate the second validation response based on the first validation response, as described above.

In some implementations, the client server may authenticate a user account associated with the device identifier based on the second validation response including the device identifier, and perform an account operation associated with the first validation request for the user account based on the user account associated with the device identifier being authenticated.

In some implementations, the client server may validate that the device identifier is associated with a user account associated with the first validation request based on the second validation response including the device identifier, and perform an account operation associated with the first validation request for the user account based on an association of the device identifier with the user account being validated.

As further shown in FIG. 6, process 600 may include transmitting the second validation response to the UE (block 660). For example, the client server may transmit the second validation response to the UE, as described above. The second validation response may indicate a status of the first validation request, which may be relayed to the application program for informing the user.

While operating on the UE, the application program may receive an input for a user request to trigger the first validation request, and may indicate whether or not the user request has been performed by the client server based on the first validation response and/or the second validation response.

Process 600 may include additional implementations, such as any single implementation or any combination of implementations described below and/or in connection with one or more other processes described elsewhere herein.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A validation system, comprising:
   a user equipment configured to store a device identifier associated with the user equipment, wherein the user equipment comprises:
      one or more first processors configured to execute an application program, wherein in response to a first validation request triggered by the application program, the one or more first processors are configured to encrypt the device identifier to generate an ephemeral token having a token value that is representative of the device identifier; and
      an application programming interface (API) configured to enable communications with the application program, wherein the API is configured to transmit the first validation request, including the ephemeral token, receive a first validation response based on the first validation request, and provide the first validation response to the application program; and
   a client server associated with the application program and communicatively coupled to the API, wherein the client server comprises one or more second processors configured to receive the first validation request, generate a second validation request, including the ephemeral token, transmit the second validation request for validation of the ephemeral token, receive a second validation response based on the ephemeral token included in the second validation request, generate the first validation response based on the second validation response, and transmit the first validation response to the API.

2. The validation system of claim 1, further comprising:
   a token validation server comprising:
      one or more third processors communicatively coupled to a database of device identifiers and configured to receive the second validation request, decrypt the ephemeral token to determine the device identifier, compare the device identifier with device identifiers stored in the database of device identifiers to determine whether the device identifier matches one of the device identifiers, and generate the second validation response based on whether the device identifier matches one of the device identifiers,
      wherein the second validation response includes the device identifier when the device identifier matches one of the device identifiers, and the second validation response does not include the device identifier when the device identifier does not match one of the device identifiers.

3. The validation system of claim 2, wherein, based on the second validation response including the device identifier, the one or more second processors are configured to authenticate a user account associated with the device identifier and perform an account operation associated with the first validation request for the user account.

4. The validation system of claim 2, wherein, based on the second validation response including the device identifier, the one or more second processors are configured to validate that the device identifier is associated with a user account and perform an account operation associated with the first validation request for the user account.

5. The validation system of claim 2, wherein the API is configured to transmit the ephemeral token to the token validation server, and the one or more third processors are configured to validate the ephemeral token received in the second validation request based on the ephemeral token received from the user equipment.

6. The validation system of claim 2, wherein the token validation server is an original equipment manufacturer (OEM) server associated with an OEM of the user equipment.

7. The validation system of claim 1, wherein the second validation request is a token validation request configured to trigger a token validation of the ephemeral token.

8. The validation system of claim 1, wherein the application program is configured to receive an input for a user request and indicate whether or not the user request has been performed by the client server based on the first validation response, and
   wherein the first validation request is triggered by the input for the user request.

9. The validation system of claim 1, wherein the device identifier is an international mobile equipment identity (IMEI).

10. A method for validating a device identifier, the method comprising:
   executing, by a user equipment, an application program configured to trigger a first validation request, wherein a client server is associated with the application program;
   generating, by the user equipment, the first validation request, including encrypting a device identifier to generate an ephemeral token having a token value;

transmitting, by the user equipment, the first validation request to the client server using an application programming interface (API) associated with the application program;

receiving, by the client server, the first validation request from the user equipment, wherein the first validation request includes an ephemeral token having a token value that is representative of a device identifier associated with the user equipment;

generating, by the client server, a second validation request, including the ephemeral token;

transmitting, by the client server, the second validation request for validation of the ephemeral token to a token validation server;

receiving, by the client server, a first validation response based on the ephemeral token included in the second validation request from the token validation server, wherein the first validation response indicates whether or not the ephemeral token is associated with a valid device identifier, and wherein the first validation response includes the device identifier of the user equipment when the ephemeral token is associated with the valid device identifier;

generating, by the client server, a second validation response based on the first validation response, wherein the second validation response indicates a status of the first validation request; and transmitting, by the client server, the second validation response to the user equipment.

11. The method of claim 10, further comprising:
receiving, by the application program during execution by the user equipment, an input for a user request to trigger the first validation request; and
indicating, by the application program during execution by the user equipment, whether or not the user request has been performed by the client server based on the first validation response.

12. The method of claim 10, further comprising:
decrypting, by the token validation server, the ephemeral token provided in the second validation request to determine the device identifier;
comparing, by the token validation server, the device identifier with device identifiers stored in a database of device identifiers to determine whether the device identifier matches one of the device identifiers;
generating, by the token validation server, the second validation response based on whether the device identifier matches one of the device identifiers, wherein the second validation response includes the device identifier when the device identifier matches one of the device identifiers, and the second validation response does not include the device identifier when the device identifier does not match one of the device identifiers; and
transmitting, by the token validation server, the second validation response to the client server.

13. The method of claim 12, further comprising:
receiving, by the token validation server, the ephemeral token from the user equipment; and
validating, by the token validation server, the ephemeral token received in the second validation request based on the ephemeral token received from the user equipment.

14. The method of claim 10, further comprising:
authenticating, by the client server, a user account associated with the device identifier based on the second validation response including the device identifier; and
performing, by the client server, an account operation associated with the first validation request for the user account based on the user account associated with the device identifier being authenticated.

15. The method of claim 10, further comprising:
validating, by the client server, that the device identifier is associated with a user account associated with the first validation request based on the second validation response including the device identifier; and
performing, by the client server, an account operation associated with the first validation request for the user account based on an association of the device identifier with the user account being validated.

16. The method of claim 10, wherein the token validation server is an original equipment manufacturer (OEM) server associated with an OEM of the user equipment.

17. The method of claim 10, wherein the second validation request is a token validation request configured to trigger a token validation of the ephemeral token.

18. The method of claim 10, wherein, wherein the application program is configured to receive an input for a user request and indicate whether or not the user request has been performed by the client server based on the first validation response, and
wherein the first validation request is triggered by the input for the user request.

19. The method of claim 10, wherein the device identifier is an international mobile equipment identity (IMEI).

* * * * *